United States Patent Office 3,131,188
Patented Apr. 28, 1964

3,131,188
NOVEL ALKENYLOXY-3,5-DIALKYL
BENZAMIDES
Robert B. Moffett, Kalamazoo, Mich., assignor to The Upjohn Company, Kalamazoo, Mich., a corporation of Michigan
No Drawing. Filed Aug. 29, 1958, Ser. No. 757,909
9 Claims. (Cl. 260—268)

This invention relates to new organic compounds and processes of making the same, and is more particularly directed to allyloxy-3,5-dialkylbenzamides and allyloxy-3,5-dialkylbenzylamines.

The novel compounds of the present invention can, for the most part, be represented by the following general formula:

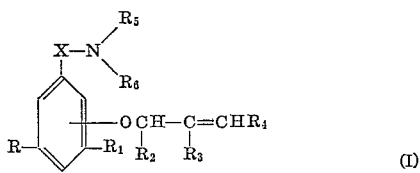

wherein R and $R_1$ represent lower-alkyl radicals, $R_2$, $R_3$, and $R_4$ are selected from the class consisting of hydrogen and lower-alkyl radicals, $R_5$ and $R_6$ taken individually are selected from the class consisting of hydrogen and lower-alkyl radicals, $R_5$ and $R_6$ taken together with —N< represent a saturated heterocyclic radical containing from five to seven atoms in the ring, one of which atoms, in addition to the nitrogen atom, is selected from the class consisting of carbon, nitrogen, and oxygen, the other ring atoms being carbon, and X represents a group selected from the class consisting of >C=O and >CH$_2$. The novel compounds of the invention also comprise the acid addition salts of the compounds of the above general Formula I in which X represents the group >CH$_2$, and also acid addition salts of the compounds of the above general Formula I in which X represents the group >C=O and $R_5$ and $R_6$ taken together with —N< represent a saturated heterocyclic radical containing a basic nitrogen atom.

The term "lower-alkyl" as used in this specification is intended to mean an alkyl radical containing from one to six carbon atoms such as methyl, ethyl, propyl, butyl, amyl, hexyl, and isomeric forms thereof. The saturated heterocyclic radicals which are represented by the group

in the above general Formula I include radicals such as pyrrolidino, lower-alkylpyrrolidino, di-(lower-alkyl) pyrrolidino, piperidino, lower-alkylpiperidino, di-(lower-alkyl)piperidino, piperazino, lower-alkylpiperazino, di-(lower-alkyl)piperazino, morpholino, lower-alkylmorpholino, di-(lower-alkyl)morpholino, and hexamethyleneimino.

The term "allyloxy," except where it is employed in the naming of individual compounds, is used in the specification to include lower-alkyl-substituted allyloxy groups such as α-methallyloxy, β-methallyloxy, crotyloxy, γ-ethallyloxy, and like groups.

It is an object of the invention to produce novel compounds having the Formula I above. Other objects of the invention will be apparent to those skilled in the art to which the invention pertains.

The novel compounds having the Formula I in which X represents a >C=O group are prepared by amidating the corresponding allyloxy-3,5-dialkylbenzoic acids in a manner in itself known in the art for making benzamides. Advantageously, the corresponding allyloxy-3,5-dialkylbenzoic acids are converted to the acid halides in a manner known in the art for making benzoyl halides, for example, by reaction with thionyl halide, phosphoryl halides or other acid halogenating agents, and the allyloxy-3,5-dialkylbenzoyl halides thus obtained are condensed with ammonia or an amine

wherein $R_5$ and $R_6$ have the significance hereinbefore defined, to produce the desired allyloxy-3,5-dialkylbenzamides. The allyloxy-3,5-dialkylbenzoic acids which are employed as starting materials in the above procedure can be prepared from the corresponding 3,5-dialkylhydroxybenzoic acids by methods known in the art for the preparation of allyl and substituted allyl ethers of phenols. Advantageously the 3,5-dialkylhydroxybenzoic acids or their esters (e.g., lower-alkyl esters) are reacted with an allyl or substituted allyl halide in the presence of a base such as an alkali metal alkoxide, anhydrous potassium carbonate, and the like. The allyloxybenzoic acid ester so produced is then subjected to hydrolysis, for example, using aqueous alkali metal hydroxide, to yield the desired allyloxy-3,5-dialkylbenzoic acid. The proportions of allyl or substituted allyl halide and 3,5-dialkylhydroxybenzoic acid employed in the above reaction can vary over a wide range but it is preferable that the allyl halide be employed in an amount in excess of the stoichiometric quantity. The 3,5-dialkylhydroxybenzoic acids employed in the preparation of the allyl ethers can themselves be prepared by methods well-known in the art. For example, the corresponding 2,6-dialkylphenols and 2,4-dialkylphenols can be subjected to the Kolbe reaction in which the phenol in the form of its sodium derivative is treated with carbon dioxide. The 2,6-dialkylphenols yield the corresponding 3,5-dialkyl-4-hydroxybenzoic acids and the 2,4-dialkylphenols yield the corresponding 3,5-dialkyl-2-hydroxybenzoic acids. Certain of the 3,5-dialkylhydroxybenzoic acids can be obtained by special procedures. Thus 3,5-di-n-propyl-4-hydroxybenzoic acid can be prepared in the form of its ester by catalytic hydrogenation of an ester of 3,5-diallyl-4-hydroxybenzoic acid, such as the ethyl ester, which can be obtained by the procedure of Claisen and Eisleb, Liebig's Annalen der Chemie, 401, 21 (1913). The ester so obtained can be converted to the corresponding allyl ether and then subjected to saponification to yield the desired 4-allyloxy-3,5-di-n-propylbenzoic acid. Alternatively, the ester can be hydrolyzed directly to 3,5-di-n-propyl-4-hydroxybenzoic acid and the latter then converted to the allyl ether. Similarly, 3,5-din-propyl-2-hydroxybenzoic acid can be obtained from the esters of 3,5-diallyl-2-hydroxybenzoic acid [Claisen and Eisleb, ibid., p. 77].

The novel compounds of the invention having the Formula I above in which X represents a >CH$_2$ group are prepared by reduction, preferably with lithium aluminum hydride, of the corresponding amides, i.e., the compounds having the Formula I above in which X represents the group >C=O. Advantageously the reduction is effected by adding the amide to a suspension of lithium aluminum hydride in an inert solvent, such as ether, under anhydrous conditions. After the addition is complete the reaction mixture is preferably heated under reflux for a period of several hours before being decomposed by the addition of water and aqueous alkali metal hydroxide. The desired amine is isolated by conventional methods, for example, by extraction in a solvent followed by recrystallization, where the amine is a solid, or by distillation where the amine is a liquid. The amount of lithium aluminum hydride employed in the above reduction is advantageously in excess of the stoichiometric quantity.

The acid addition salts of the invention comprise salts of amines having the Formula I with organic and inorganic acids. These salts can be prepared by conventional methods. For example, the amines can be dissolved in at least an equivalent amount of an aqueous solution of the appropriate acid and the salt can be isolated by evaporation of the solution. Alternatively, the amine, in solution in an organic solvent such as methanol, ethanol, ethyl acetate, ether, and the like, can be treated with at least an equivalent amount of the appropriate acid; according to the nature of the solvent employed the desired salt will separate spontaneously or can be precipitated by the addition of a solvent in which the salt is insoluble. Where the salts of the invention are to be employed for therapeutic purposes as hereinafter described it is necessary that the salts be derived from pharmacologically acceptable acids. Suitable such acids include sulfuric, hydrochloric, nitric, phosphoric, benzoic, p-toluene-sulfonic, salicylic, acetic, propionic, tartaric, citric, and succinic acids, and the like. Where the salts of the invention are to be employed for agricultural and horticultural use as hereinafter described, the toxicity to humans of the acids employed to form the salts is less important and, in addition to the above acids, acids such as trichloroacetic, dichloropropionic, oxalic, thiocyanic, and the like, may be employed to form the salts.

The novel compounds of the invention exhibit activity as central nervous system depressants as will be more particularly described below. In addition, the novel compounds of the Formula I above in which the group X represents >C=O, are intermediates, that is to say can be reduced as described above, in the formation of the novel compounds having the Formula I above in which the group X represents >CH$_2$. The latter compounds are useful in accordance with U.S. Patents 1,915,334 and 2,075,359, in forming amine fluosilicate mothproofing agents and, in accordance with U.S. Patents 2,425,320 and 2,606,155, in forming amine thiocyanate-formaldehyde condensation products for use as pickling inhibitors.

The activity of the novel compounds of the invention as central nervous system depressants is manifested in a variety of different forms, illustratively as hypnotics, as tranquillizing agents and as drug potentiators, for example, in prolonging the effect of anaesthetics, analgesics, sedatives and hypnotics. The compounds 4-allyloxy-3,5-di-n-propylbenzamide, 4-allyloxy-3,5-di-n-propyl-N,N-dimethylbenzylamine, and 2-allyloxy-3,5-di-n-propylbenzylamine also depress motor activity. Illustrative of the activity of novel compounds of the invention in potentiating the action of drugs are the results shown in the following table wherein the activity of representative compounds having the Formula I above in prolonging hexobarbital-induced sleeping time in mice is compared with that of chlorpromazine.

TABLE

[Effect of compounds of invention on hexobarbital induced sleep]

| Compound | Percent increase of sleeping time at dosages expressed in percent of the LD$_{50}$ | | | | |
|---|---|---|---|---|---|
| | 20 | 10 | 5 | 2.5 | 1.25 |
| 4-allyloxy-3,5-di-n-propylbenzamide | >4,000 | >3,750 | >3,000 | 1,312 | 931 |
| 4-allyloxy-3,5-di-n-propylbenzylamine citrate | >2,527 | >1,023 | >1,171 | 894 | |
| 4-allyloxy-3,5-di-n-propyl-N-methylbenzamide | >>1,350 | >983 | 884 | 363 | 224 |
| 4-allyloxy-3,5-di-n-propyl-N,N-dimethylbenzamide | 655 | 301 | 158 | | |
| 4-allyloxy-3,5-di-n-propyl-N,N-dimethylbenzylamine hydrochloride | >755 | >646 | >617 | 376 | |
| 4-allyloxy-3,5-di-n-propyl-N,N-diethylbenzamide | >1,470 | >657 | >548 | >405 | |
| 4-β-methallyloxy-3,5-di-n-propylbenzamide | >>486 | 491 | 125 | 110 | |
| 2-allyloxy-3,5-di-n-propylbenzamide | 1,656 | >826 | 409 | 249 | |
| 2-allyloxy-3,5-di-n-propylbenzylamine hydrochloride | 500 | 277 | 292 | 84 | |
| 4-allyloxy-3,5-di-methyl-N,N-diethyl-benzamide | 1,141 | 1,020 | 345 | 373 | |
| 4-allyloxy-3,5-di-isopropylbenzylamine hydrochloride | 1,642 | >>906 | >>882 | 583 | |
| Chloropromazine | 1,104 | 752 | 447 | 387 | |

The novel compounds of the invention also show activity as herbicides. Illustratively the compounds 4 - allyloxy - 3,5 - di - n - propyl - N,N - dimethylbenzamide and 4-allyloxy-3,5-di-n-propyl-N,N-dimethylbenzylamine can be used for the effective control of undesirable grasses, particularly crabgrass, and the latter compound can be employed as a pre-emergence herbicide for the selective control of weeds in cotton crops. The compounds 4 - allyloxy - 3,5 - dimethyl - N,N - diethylbenzamide, 1 - (4 - allyloxy - 3,5 - di - n - propylbenzoyl)-pyrrolidine and 4-allyloxy-3,5-di-n-propyl-N,N-diethylbenzylamine show general herbicidal activity. The compound 1 - (4 - allyloxy - 3,5 - di - n - propylbenzoyl)-4-methylpiperazine shows selective activity against broad leaf plants.

In addition, the compound 4-allyloxy-3,5-di-n-propyl-N-methylbenzylamine exhibits activity as a horticultural fungicide and is particularly active against wheat rust and bean rust.

The novel compounds of the invention, when employed for therapeutic purposes, can be combined with solid or liquid pharmaceutical carriers and formulated as tablets, powder packs, or capsules, or dissolved or suspended in suitable solvents, for oral or parenteral administration.

The novel compounds of the invention, when employed for agricultural and horticultural purposes, can be combined with carriers and diluents commonly employed in the application of herbicides and pesticides to soil and growing crops. Thus the compounds of the invention can be formulated as dusts, dispersible powders, aqueous dispersions, emulsions and emulsifiable concentrates.

The following examples are illustrative of the process and products of the present invention, but are not to be construed as limiting.

PREPARATION 1

*4-Allyloxy-3,5-Di-n-Propylbenzoyl Chloride*

A solution of 200 grams (0.706 mole) of 3,5-di-n-propyl-4-allyloxybenzoic acid (copending application Serial No. 603,236, filed August 10, 1956) and 100 milliliters of thionyl chloride in 200 milliliters of benzene was heated under reflux for two hours. The solvent and excess thionyl chloride was distilled under reduced pressure and then the residue was distilled from a Claisen flask, giving 186.4 grams of 4-allyloxy-3,5-di-n-propylbenzoyl chloride (94 percent) as a yellow liquid having a boiling point of 127 degrees centigrade at a pressure of 0.1 millimeter of mercury; $n_D^{25}$ 1.4281.

*Analysis.*—Calcd. for $C_{16}H_{21}ClO_2$: Cl, 12.62. Found: Cl, 12.70.

PREPARATION 2

4-Allyloxy-3,5-Diisopropylbenzoic Acid

In a three-liter flask was placed 187 grams (0.84 mole) of 4-hydroxy-3,5-diisopropylbenzoic acid [J. Am. Chem. Soc. 79, 5019 (1957)] in 400 milliliters of methanol. The flask was fitted with a stirrer, reflux condenser and two dropping funnels. In one funnel was placed a solution of 80 grams (3.5 moles) of sodium in 1.2 liters of methanol; in the other funnel was placed 346 milliliters (four moles) of allyl bromide. One-half of the sodium methoxide solution and the allyl bromide were added with stirring and the mixture was heated (about three hours) under reflux until neutral. Then one-half of the remaining sodium methoxide solution and the remaining allyl bromide were added and the mixture again heated (about one hour) under reflux until neutral. The remainder of the sodium methoxide solution and the allyl bromide were added and the refluxing was continued for five hours until the mixture was again neutral. About one liter of solvent was distilled to remove excess allyl bromide and 130 milliliters of fifty percent aqueous sodium hydroxide and 300 milliliters of water were added. After heating under reflux for two hours most of the remaining solvent was removed under reduced pressure on a steam bath and water was added. The mixture was extracted twice with ether and the ether solutions were combined and extracted twice with water. The aqueous extracts were combined and acidified. The suspension so obtained was warmed while bubbling in nitrogen to remove ether and the solid was collected by filtration, washed with water, dried, and recrystallized from 700 milliliters of ethanol. There was thus obtained 149 grams of 4-allyloxy-3,5-diisopropylbenzoic acid in the form of a crystalline solid having a melting point of 185.5 to 187.5 degrees centigrade.

*Analysis.*—Calcd. for $C_{16}H_{22}O_3$: C, 73.25; H, 8.46. Found: C, 73.13; H, 8.60.

PREPARATION 3

4-Allyloxy-3,5-Dimethylbenzoic Acid

To a suspension of 223 grams (1.34 moles) of 3,5-dimethyl-4-hydroxybenzoic acid [Monatsh. 81, 1071 (1950)] in 500 milliliters of methanol was added, with stirring one-half of a solution of 115 grams of sodium in 1.7 liters of methanol and one-half of 475 milliliters (5.5 moles) of allyl bromide. The mixture was heated (about one hour) under reflux with stirring until it was neutral and then one-half of the remainder of the sodium methoxide solution and of the allyl bromide was added. The mixture was again heated under reflux until neutral when the remainder of the sodium methoxide solution and the allyl bromide was added. The mixture was heated under reflux until neutral and about 500 milliliters of the solvent was then distilled. To the residue was added 250 milliliters of fifty percent aqueous sodium hydroxide and 300 milliliters of water and the mixture was heated under reflux for three hours. Most of the methanol was then distilled from a steam bath and water was added to the residue. The mixture was cooled and extracted twice with ether. The aqueous solution was acidified with hydrochloric acid and the solid which separated was collected, washed with water, dried, and recrystallized from ethanol. There was thus obtained 171.7 grams (second crop; 45.8 grams) of 4-allyloxy-3,5-dimethylbenzoic acid in the form of a crystalline solid having a melting point of 146 to 146.5 degrees centigrade.

*Analysis.*—Calcd. for $C_{12}H_{14}O_3$: C, 69.88; H, 6.84. Found: C, 69.59; H, 6.72.

PREPARATION 4

3,5-Di-n-Propyl-4-β-Methallyloxybenzoic Acid (A) ETHYL 3,5-DI-n-PROPYL-4-β-METHALLYLOXYBENZOATE To a solution of 13.8 grams (0.6 mole) of sodium in 200 milliliters of methanol was added a solution of 150.2 grams (0.6 mole) of ethyl 3,5-di-n-propyl-4-hydroxybenzoate (prepared as described in copending application Serial No. 603,236, filed August 10, 1956) in 300 milliliters of methanol. To the solution was added slowly eighty grams (1.0 mole) of β-methallyl chloride after which the mixture was stirred for one hour at room temperature and one hour under reflux. Most of the solvent was distilled and the residue was diluted with water and extracted three times with benzene. The benzene solution was washed with 100 milliliters of ice-cold ten percent sodium hydroxide solution, then twice with water, and finally with saturated sodium chloride solution. Part of the benzene was distilled to dry the solution which was then shaken with 100 grams of Fisher alumina and filtered through another 100 grams of alumina. The solvent was removed and the residue was distilled through a six-inch column (one-eighth inch helices) giving 94.13 grams of a liquid having a boiling point of 112 to 120 degrees centigrade at 0.02 millimeter of mercury; $n_D^{25}$ 1.5090 to 1.5098. The distillate was mixed with Claisen solution (350 grams of potassium hydroxide dissolved in 250 milliliters of water and diluted with an equal volume of methanol). The mixture was extracted three times with Skellysolve B (mixture of hexanes) and the Skellysolve B solution was washed with saturated sodium chloride solution and dried over anhydrous sodium sulfate. The solvent was removed and the residue was distilled through a six-inch column (one-eighth inch helices). There was thus obtained ethyl 3,5-di-n-propyl-4-β-methallyloxybenzoate in the form of an oil having a boiling point of 118 to 125 degrees centigrade at a pressure of 0.025 millimeter of mercury; $n_D^{25}$ 1.5061.

*Analysis.*—Calcd. for $C_{19}H_{28}O_3$: C, 74.96; H, 9.27. Found: C, 74.96; H, 8.81.

(B) 3,5-DI-n-PROPYL-4-β-METHALLYLOXYBENZOIC ACID

A mixture of 30.4 grams (0.1 mole) of ethyl 3,5-di-n-propyl-4-β-methallyloxybenzoate, 35 grams of 85 percent potassium hydroxide in seventy milliliters of water and 125 milliliters of ethanol was heated under reflux with stirring for eight hours. Most of the ethanol was distilled, water was added, the mixture was extracted twice with ether and acidified. The acid solution was extracted three times with ether which was washed with water and dried over anhydrous sodium sulfate. The ether was distilled and the residue crystallized on standing. There was thus obtained 20.7 grams of 3,5-di-n-propyl-4-β-methallyloxybenzoic acid in the form of a crystalline solid having a melting point of 80 to 83 degrees centigrade.

*Analysis.*—Calcd. for $C_{17}H_{24}O_3$: C, 73.88; H, 8.75. Found: C, 74.17; H, 9.29.

PREPARATION 5

4-Allyloxy-3,5-Diethylbenzoyl Chloride (A) 3,5-DIETHYL-4-HYDROXYBENZOIC ACID To a solution of 69 grams (3.0 moles) of sodium in one liter of methanol was added a solution of 450 grams (3.0 moles) of 2,6-diethylphenol (Ber. 57, 1275) in 250 milliliters of toluene. The methanol was then distilled through a Vigreux column and toluene was added to keep the volume at about 1.5 to 1.7 liters. When the boiling point reached 107 degrees centigrade the contents of the flask were cooled under an atmosphere of nitrogen, transferred to an autoclave and heated at 200 degrees centigrade for ten hours under a carbon dioxide pressure of 450 pounds per square inch. The reaction product was washed from the autoclave with water and the toluene layer was separated and extracted with 600 milliliters of five percent aqueous sodium bicarbonate solution. The aqueous solutions were combined, washed with ether and acidified with hydrochloric acid. The solid which separated was collected, washed with water, dried and recrystallized from aqueous ethanol. There was thus obtained 193 grams of 3,5-diethyl-4-hydroxybenzoic acid having a melting point of 151 to 158 degrees centigrade.

*Analysis.*—Calcd. for $C_{11}H_{14}O_3$: C, 68.02; H, 7.27. Found: C, 68.31; H, 7.13.

(B) 4-ALLYLOXY-3,5-DIETHYLBENZOIC ACID

To a solution of 171.1 grams (0.914 mole) of 3,5-diethyl-4-hydroxybenzoic acid in 150 milliliters of methanol was added with stirring, one-half of a solution of 53 grams of sodium in 800 milliliters of methanol followed by one-half of 332 grams (2.7 moles) of allyl bromide. The mixture was heated under reflux with stirring until it was neutral. One-half of the remaining sodium methoxide solution and allyl bromide were added and the refluxing was continued until the mixture was again neutral. The remainder of the sodium methoxide solution and the allyl bromide were then added and the refluxing continued until the mixture was neutral. Part of the solvent and the excess of allyl bromide were distilled under reduced pressure and 150 milliliters of fifty percent aqueous sodium hydroxide, 250 milliliters of water and 100 milliliters of methanol were then added. The mixture was heated under reflux for two hours and part of the solvent was distilled. Water was added and the mixture was extracted twice with ether. The ether solutions were back extracted with water and the aqueous solutions were combined and acidified with hydrochloric acid. The oil which separated rapidly crystallized and was collected, washed with water, dried, and recrystallized giving 158.9 grams of crystals having a melting point of 88 to 91 degrees centigrade. A portion of this material was recrystallized from ethanol. There was thus obtained 4-allyloxy-3,4-diethylbenzoic acid having a melting point of 91 to 92.5 degrees centigrade.

*Analysis.*—Calcd. for $C_{14}H_{18}O_3$: C, 71.77; H, 7.74. Found: C, 72.16; H, 7.91.

(C) 4-ALLOYLOXY-3,5-DIETHYLBENZOYL CHLORIDE

A solution of 133.5 grams (0.57 mole) of 4-allyloxy-3,5-diethylbenzoic acid in 100 milliliters of thionyl chloride and 100 milliliters of benzene was heated under reflux with stirring for three and one-half hours. After distilling the excess thionyl chloride and benzene the crude acid chloride was diluted with benzene to a volume of 500 milliliters. This solution of 4-allyloxy-3,5-diethylbenzoyl chloride in benzene was used as such in the procedures described in Examples 12 and 13 below.

PREPARATION 6

*2-Allyloxy-3,5-Di-n-Propylbenzoic Acid*

(A) METHYL-3,5-DI-n-PROPYL-2-HYDROXYBENZOATE

A solution of 58 grams (0.25 mole) of methyl 3,5-diallyl-2-hydroxybenzoate [Claisen and Eisleb, Ann. 401, 77, (1913)] in 100 milliliters of methanol was hydrogenated in the presence of 0.2 gram of platinum oxide at room temperature and a pressure of fifty pounds per square inch. The theoretical amount of hydrogen was absorbed in about one-half hour. Two other similar runs were made and the reaction products from the three runs (representing a total of 0.894 mole of the starting methyl 3,5-diallyl - 2 - hydroxy-benzoate) were combined and filtered. The solvent was removed from the filtrate and the residue was distilled through a six-inch column (one-eighth inch helices). There was thus obtained 207.8 grams of methyl 3,5-di-n-propyl-2-hydroxy-benzoate in the form of an oil having a boiling point of 127 degrees centigrade at a pressure of 1.5 millimeters of mercury; $n_D^{25}$ 1.5139.

*Analysis.*—Calcd. for $C_{14}H_{20}O_3$: C, 71.16; H, 8.53. Found: C, 71.34; H, 8.78.

(B) METHYL 2-ALLYLOXY-3,5-DI-n-PROPYLBENZOATE

To a solution of 170 grams (0.71 mole) of methyl 3,5-di-n-propyl-2-hydroxybenzoate in 200 milliliters of methanol were added, portionwise and alternately, 121 grams (1.0 mole) of allyl bromide and a solution of 18.4 grams (0.8 mole) of sodium in 300 milliliters of methanol. When the addition was complete the mixture was heated under reflux until neutral. The solvent was distilled and the residue was diluted with ether. The ether solution was washed twice with water, then with ice-cold twenty percent aqueous sodium hydroxide solution, then twice with water and finally with saturated sodium chloride solution. After drying over anhydrous sodium sulfate, filtering and removing the solvent the product was dissolved in 700 milliliters of Skellysolve B and shaken with 150 grams of Fisher alumina. The solution was filtered through an additional 150 grams of alumina and the solvent was removed. The residue was distilled through a twelve-inch column (one-eighth inch helices) and the fraction having a boiling point of 115 to 120 degrees centigrade at a pressure of 0.35 millimeter of mercury was collected. There was thus obtained methyl 2-allyloxy-3,5-di-n-propylbenzoate in the form of an oil; $n_D^{25}$ 1.5051.

*Analysis.*—Calcd. for $C_{17}H_{24}O_3$: C, 73.88; H, 8.75. Found: C, 74.35; H, 8.93.

(C) 2-ALLYLOXY-3,5-DI-n-PROPYLBENZOIC ACID

A solution of 114.1 grams (0.413 mole) of methyl 2-allyloxy-3,5-di-n-propylbenzoate, 500 milliliters of twenty percent aqueous sodium hydroxide solution and 400 milliliters of methanol was heated under under reflux for six hours. Part of the solvent was distilled under reduced pressure and 1.5 liters of water was added. Ether was added until two layers were formed and the ether layer was extracted with two portions of 500 milliliters of water. The combined aqueous extracts were acidified and the oil which separated crystallized on bubbling in nitrogen to remove the remaining ether. The solid was collected, washed with water, dried, and recrystallized from pentane. There was thus obtained 80.2 grams of 2-allyloxy-3,5-di-n-propylbenzoic acid in the form of a crystalline solid having a melting point of 47 to 49 degrees centigrade.

*Analysis.*—Calcd. for $C_{16}H_{22}O_3$: C, 73.25; H, 8.46. Found: C, 73.07; H, 8.75.

EXAMPLE 1

(A) 4-ALLYLOXY-3,5-DI-n-PROPYLBENZAMIDE

A mixture of 28.1 grams (0.1 mole) of 3,5-di-n-propyl-4-allyloxybenzoyl chloride and 300 milliliters of aqueous ammonium hydroxide was shaken and cooled until the reaction subsided, and was then shaken at room temperature for 1.5 hours. After standing for several days, the crystalline product was collected, washed with water, and dried, giving 22.1 grams (84.6 percent) of white crystals, melting point 104 to 107 degrees centigrade. This was recrystallized from technical n-hexane giving 21.3 grams of 4-allyloxy-3,5-di-n-propylbenzamide in the form of white crystals having a melting point of 108.5 to 109.5 degrees centigrade.

*Analysis.*—Calcd. for $C_{16}H_{23}NO_2$: C, 73.53; H, 8.87; N, 5.36. Found: C, 73.58; H, 8.53; N, 5.29.

(B) 4-ALLYLOXY-3,5-DI-n-PROPYLBENZYLAMINE (a) *Free base.*— To a suspension of ten grams (0.26 mole) of lithium aluminum hydride in 150 milliliters of absolute ether was slowly added with stirring under reflux a solution of 39.2 grams (0.15 mole) of 4-allyloxy-3,5-di-n-propylbenzamide in 250 milliliters of absolute ether. After stirring for five hours under reflux there was carefully added in succession 25 milliliters of ethyl acetate in 300 milliliters of ether, ten milliliters of water, eight milliliters of twenty percent aqueous sodium hydroxide solution, and 37 milliliters of water. After thorough mixing, the product was filtered and the solid was extracted with ether. The ether solution was extracted with dilute hydrochloric acid and then with water. The aqueous solutions were washed with ether and made basic with aqueous sodium hydroxide solution. The free base was extracted three times with ether, washed with water and saturated sodium chloride solution and dried over anhydrous sodium sulfate. After filtration and removal of the solvent the free base was distilled, giving 16.8 grams (42 percent) of 4-allyloxy-3,5-di-n-propylbenzylamine in the form of a colorless liquid having a boiling point of 110 degrees centigrade at a pressure of 0.025 millimeter of mercury; $n_D^{27}$ 1.5143.

*Analysis.*—Calcd. for $C_{16}H_{25}NO$: C, 77.68; H, 10.17; N, 5.66. Found: C, 77.90; H, 10.22; N, 5.62.

(b) *Citrate.*—To a solution of the above free base in ether was added an ethanolic solution of citric acid. After cooling the crystalline salt was collected, washed with ether and dried, giving 25.7 grams (38 percent) of white 4-allyloxy-3,5-di-n-propylbenzylamine citrate having a melting point of 139 to 140 degrees centigrade.

*Analysis.*—Calcd. for $C_{22}H_{33}NO_8$: C, 60.12; H, 7.57; N, 3.19; equiv. wt., 149. Found: C, 60.14; H, 7.60; N, 3.25; equiv. wt. 142.

EXAMPLE 2

(A) 4-ALLYLOXY-3,5-DI-n-PROPYL-N-METHYL-BENZAMIDE

To 14.1 grams (0.05 mole) of 3,5-di-n-propyl-4-allyloxybenzoyl chloride was slowly added with cooling 100 milliliters of forty percent aqueous methylamine. The mixture was shaken for two hours and allowed to stand overnight, giving 14.6 grams of white solid. This was dissolved in technical n-hexane, washed twice with aqueous sodium carbonate solution, then with water, and dried over anhydrous sodium sulfate. Filtration and distillation of the solvent gave a yellow oil which soon crystallized. This was dissolved in pentane, filtered, concentrated and cooled to minus eighteen degrees centigrade. The resulting crystals of 4-allyloxy-3,5-di-n-propyl-N-methylbenzamide were collected, washed with cold pentane and dried, giving 13.4 grams (97.4 percent) of white solid, melting point 64.5 to 67 degrees centigrade.

*Analysis.*—Calcd. for $C_{17}H_{25}NO_2$: C, 74.14; H, 9.15; N, 5.09. Found: C, 74.41; H, 9.07; N, 5.01.

(B) 4-ALLYLOXY-3,5-DI-n-PROPYL-N-METHYL-BENZYLAMINE (a) *Free base.*—To a suspension of fifteen grams (0.396 mole) of lithium aluminum hydride in 300 milliliters of absolute ether was added 40.9 grams (0.162 mole) of 4-allyloxy-3,5-di-n-propyl-N-methylbenzamide in 350 milliliters of absolute ether. The mixture was heated under reflux for three hours and then allowed to stand overnight at room temperature. To the resulting mixture was added slowly in succession, 50 milliliters of ethyl acetate in 150 milliliters of ether, fifteen milliliters of water, thirteen milliliters of twenty percent aqueous sodium hydroxide solution, and 55 milliliters of water. After thorough mixing the product was filtered and the isolated solid was extracted with ether. The ethereal solution was extracted with dilute hydrochloric acid, the acid extract was washed with ether and then made basic by the addition of aqueous sodium hydroxide solution. The liberated oil was extracted in ether, the ethereal extract was washed twice with water, then with saturated sodium chloride solution and dried over anhydrous potassium carbonate. The ether was removed by distillation and the residue was distilled under reduced pressure. There was thus obtained 4-allyloxy-3,5-di-n-propyl-N-methylbenzylamine in the form of a colorless liquid having a boiling point of 115 degrees centigrade at a pressure of 0.025 millimeter of mercury.

*Analysis.*—Calcd. for $C_{17}H_{27}NO$: N, 5.36. Found: N, 5.40.

(b) *Hydrochloride.*—A solution of 30.25 grams (0.115 mole) of the above free base in 100 milliliters of ethyl acetate was acidified with ethanolic hydrogen chloride. The solution was evaporated under reduced pressure. The residue thus obtained was recrystallized successively from benzene-pentane mixture, absolute ether, benzene-Skellysolve B mixture, and ether-benzene mixture. The resulting 4-allyloxy-3,5-di-n-propyl-N-methylbenzylamine hydrochloride had a melting point of 157 to 158 degrees centigrade.

*Analysis.*—Calcd. for $C_{17}H_{28}ClNO$: C, 68.55; H, 9.47; N, 4.70. Found: C, 68.85; H, 9.47; N, 4.46.

EXAMPLE 3

(A) 4-ALLYLOXY-3,5-DI-n-PROPYL-N,N-DIMETHYL-BENZAMIDE

To a cold solution of 45 grams (1.0 mole) of dimethylamine in 200 milliliters of benzene was slowly added with cooling and stirring 92.5 grams (0.33 mole) of 3,5-di-n-propyl-4-allyloxybenzoyl chloride. The mixture was stirred for three hours and allowed to stand overnight. The mixture was washed twice with water and then with saturated sodium chloride solution. The aqueous solutions were extracted with ether. The ether and benzene solutions were dried over anhydrous sodium sulfate, filtered, and the solvent was removed. The product was distilled from a Claisen flask, giving 94.2 grams (98 percent) of 4-allyloxy-3,5-di-n-propyl-N,N-dimethylbenzamide as white crystals, melting point 82 to 84 degrees centigrade.

*Analysis.*—Calcd. for $C_{20}H_{31}NO_2$: C, 75.66; H, 9.84; N, 4.41. Found: C, 75.80; H, 9.55; N, 4.56.

(B) 4-ALLYLOXY-3,5-DI-n-PROPYL-N,N-DIMETHYL-BENZYLAMINE (a) *Free base.*—To a mixture of ten grams (0.26 mole) of lithium aluminum hydride and 150 milliliters of absolute ether was slowly added with stirring a solution of 43.5 grams (0.15 mole) of 4-allyloxy-3,5-di-n-propyl-N,N-dimethylbenzamide in 100 milliliters of absolute ether. The mixture was then heated under reflux with stirring for three hours and allowed to stand overnight. Then were carefully added in succession, 34 milliliters of ethyl acetate in 300 milliliters of ether, ten milliliters of water, and eight milliliters of twenty percent aqueous sodium hydroxide solution, and 37 milliliters of water. After stirring vigorously, the mixture was filtered and the precipitate was well washed with ether. The filtrate was extracted with dilute hydrochloric acid and then with water. The aqueous solutions were washed with ether and made basic with aqueous sodium hydroxide solution. An oil separated which was extracted three times with ether. The ether solutions were washed twice with water, then with saturated sodium chloride solution and dried over anhydrous potassium carbonate. After filtration and removal of the ether, the product was distilled through a six-inch (helices) column, giving 37.0 grams (89.5 percent) of 4-allyloxy-3,5-di-n-propyl-N,N-dimethylbenzylamine as a nearly colorless liquid, having a boiling point of 107 degrees at a pressure of 0.05 millimeter of mercury; $n_D^{25}$ 1.4996.

*Analysis.*—Calcd. for $C_{18}H_{29}NO$: C, 78.49; H, 10.61; N, 5.09. Found: C, 78.68; H, 10.34; N, 5.01.

(b) *Hydrochloride.*—A solution of 36 grams (0.13 mole) of the above free base in 100 milliliters of ethyl acetate was acidified with ethanolic hydrogen chloride and diluted to 500 milliliters with absolute ether. On cooling to minus eighteen degrees centigrade, crystals separated. The product was collected, washed with ether and dried, giving 16.9 grams of 4-allyloxy-3,5-di-n-propyl-N,N-dimethylbenzylamine hydrochloride as waxy crystals having a melting point of 138 to 140 degrees centigrade. An additional 13.4 grams of product having a melting point of 134 to 138 degrees centigrade was obtained from the filtrate. The total yield was 74.6 percent.

*Analysis.*—Calcd. for $C_{18}H_{30}ClNO$: C, 69.32; H, 9.70; Cl, 11.37. Found: C, 68.80; H, 9.38; Cl, 11.40.

EXAMPLE 4

(A) 4-ALLYLOXY-3,5-DI-n-PROPYL-N,N-DIETHYL-BENZAMIDE

To a solution of 56 grams (0.2 mole) of 4-allyloxy-3,5-di-n-propylbenzoyl chloride in 100 milliliters of benzene was added slowly, with shaking and cooling, 44 grams (0.6 mole) of diethylamine. The resulting mixture was allowed to stand overnight at room temperature and was then washed with water, followed by saturated sodium chloride solution, and dried over anhydrous sodium sulfate. The dried solution was distilled to remove the benzene and the residue was distilled under reduced pressure. There was thus obtained 4-allyloxy-3,5-di-n-propyl-N,N-diethylbenzamide in the form of a liquid having a boiling point of 128 degrees centigrade at a pressure of 0.03 millimeter of mercury; $n_D^{25}$ 1.5112.

*Analysis.*—Calcd. for $C_{20}H_{31}NO_2$: C, 75.66; H, 9.84; N, 4.41. Found: C, 76.03; H, 9.98; N, 4.25.

(B) 4-ALLYLOXY-3,5-DI-n-PROPYL-N,N-DIETHYL-BENZYLAMINE (*a*) *Free base.*—To a suspension of ten grams (0.26 mole) of lithium aluminum hydride in 150 milliliters of absolute ether was added slowly, with stirring under reflux, an ether solution of 35.26 grams (0.105 mole) of 4-allyloxy-3,5-di-n-propyl-N,N-diethylbenzamide. After the addition was complete, the mixture was stirred under reflux for three hours and then allowed to stand overnight. To the mixture was added carefully in succession 35 milliliters of ethyl acetate in 300 milliliters of ether, ten milliliters of water, eight milliliters of twenty percent aqueous sodium hydroxide solution and 37 milliliters of water. After thorough mixing the solid which had separated was isolated by filtration and extracted with ether. The ether solution was extracted twice with dilute hydrochloric acid and the combined acid extracts were washed with ether and made basic with sodium hydroxide. The free base so liberated was extracted with ether, the combined ether extracts were washed with water and with saturated sodium chloride solution and dried over anhydrous potassium carbonate. The ether solution was evaporated and the residue was distilled under reduced pressure. There was thus obtained 37.18 grams of 4-allyloxy-3,5-di-n-propyl-N,N-diethylbenzylamine in the form of a liquid having a boiling point of 130 degrees centigrade at a pressure of 0.1 millimeter of mercury; $n_D^{25}$ 1.4951.

*Analysis.*—Calcd. for $C_{20}H_{33}NO$: C, 79.15; H, 10.96; N, 4.62. Found: C, 79.17; H, 10.79; N, 4.41.

(*b*) *Hydrochloride.*—A solution of 26.5 grams (0.87 mole) of 4-allyloxy-3,5-di-n-propyl-N,N-diethylbenzylamine in 75 milliliters of ethyl acetate was acidified by the addition of a solution of hydrogen chloride in ethanol. The acid solution was diluted with ether and the solid which separated was isolated, washed with ether and dried. There was thus obtained 15.9 grams of 4-allyloxy-3,5-di-n-propyl-N,N-diethylbenzylamine hydrochloride in the form of a crystalline solid which had a melting point of 149 to 150 degrees centigrade.

*Analysis.*—Calcd. for $C_{20}H_{34}ClNO$: C, 70.87; H, 9.81; Cl, 10.46; N, 4.13. Found: C, 70.22; H, 9.86; Cl, 10.46; N, 3.91.

EXAMPLE 5

*4-Allyloxy-3,5-Di-n-Propyl-N-Isobutylbenzamide*

To 14.1 grams (0.05 mole) of 3,5-di-n-propyl-4-allyloxybenzoyl chloride was added slowly with cooling, a solution of 14.6 grams (0.2 mole) of isobutylamine in 25 milliliters of benzene. The mixture was warmed on a steam bath to complete solution and allowed to stand overnight. More benzene was added and the solution was washed three times with water. The benzene was distilled under reduced pressure below fifty degrees centigrade, giving a crystalline solid. This was recrystallized from a mixture of ethanol and water, giving 11.5 grams (72.5 percent) of 4-allyloxy-3,5-di-n-propyl-N-isobutylbenzamide as white crystals having a melting point of 82 to 84 degrees centigrade.

*Analysis.*—Calcd. for $C_{20}H_{31}NO_2$: C, 75.66; H, 9.84; N, 4.41. Found: C, 75.80; H, 9.55; N, 4.56.

EXAMPLE 6

*1-(4-Allyloxy-3,5-Di-n-Propylbenzoyl)-4-Methylpiperazine*

(*a*) *Free Base.*—A mixture of 9.0 grams (0.032 mole) of 3,5-di-n-propyl-4-allyloxybenzoyl chloride, twenty grams of N-methylpiperazine and 25 milliliters of benzene was allowed to stand overnight, then heated to the boiling point and cooled. Dilute sodium hydroxide was added and the mixture was extracted twice with ether. The ether solutions were washed three times with water and then extracted with dilute hydrochloric acid. The acid layer was washed with ether and made basic with aqueous ammonium hydroxide. An oil separated which did not crystallize. This was extracted with ether as above, and dried over anhydrous sodium sulfate. The ether solution was made acidic with ethanolic hydrogen chloride and an oily hydrochloride separated. It was reconverted to the free base and distilled, giving 10.12 grams of 1-(4-allyloxy-3,5-di-n-propylbenzoyl)-4-methylpiperazine as a light yellow oil having a boiling point of 145 degrees centigrade at a pressure of 0.005 millimeter of mercury.

(*b*) *Citrate.*—To 10.1 grams of 1-(4-allyloxy-3,5-di-n-propylbenzoyl)-4-methylpiperazine in ethanol was added a warm ethanolic solution of 9.0 grams of citric acid (hydrate). On cooling, crystals separated and after dilution with ether the product was collected, giving 14.6 grams of 1-(4-allyloxy-3,5-di-n-propylbenzoyl)-4-methylpiperazine citrate as a solid having a melting point of 172 to 173 degrees centigrade. Recrystallization from 300 milliliters of isopropyl alcohol gave 14.25 grams of white crystals with the same melting point.

*Analysis.*—Calcd. for $C_{27}H_{40}N_2O_9$: C, 60.43; H, 7.51; N, 5.22. Found: C, 60.15; H, 7.57; N, 5.28.

EXAMPLE 7

(A) 4-ALLYLOXY-3,5-DI-n-PROPYLBENZOYL-1-PYRROLIDINE

To a solution of 24.1 grams (0.086 mole) of 4-allyloxy-3,5-di-n-propylbenzoyl chloride in fifty milliliters of benzene was slowly added 20.8 milliliters (0.25 mole) of pyrrolidine. The mixture became hot and a liquid layer separated. After standing for two hours with occasional shaking it was diluted with ether, washed with water, then with dilute hydrochloric acid and again with water. The solvent was removed and the residue was distilled, giving 25.96 grams (96 percent) of 4-allyloxy-3,5-di-n-propylbenzoyl-1-pyrrolidine as a nearly colorless liquid having a boiling point of 160 degrees centigrade at a pressure of 0.005 millimeter of mercury; $n_D^{25}$ 1.5330.

*Analysis.*—Calcd. for $C_{20}H_{29}NO_2$: C, 76.15; H, 9.27; N, 4.44. Found: C, 75.87; H, 9.23; N, 4.54.

(B) 4-ALLYLOXY-3,5-DI-n-PROPYLBENZYL-1-PYRROLIDINE (*a*) *Free base.*—To 3.8 grams (0.1 mole) of lithium aluminum hydride in fifty milliliters of absolute ether in a 500-milliliter flask was slowly added 15.1 grams (0.048 mole) of 4-allyloxy-3,5-di-n-propylbenzoyl-1-pyrrolidine in fifty milliliters of absolute ether. The mixture was heated under reflux with stirring for three hours and allowed to stand overnight. Then were added in succession with stirring twelve milliliters of ethyl acetate in 100 milliliters of ether, four milliliters of water, three milliliters of twenty percent aqueous sodium hydroxide, and fourteen milliliters of water. After thorough stirring the mixture was filtered and the precipitate was extracted with ether. The ether solutions were washed with water and then extracted with dilute hydrochloric acid. An oily hydrochloride separated, insoluble in both layers. The aqueous layer and oily hydrochloride layer were combined and made basic with sodium hydroxide. The free base was extracted three times with ether, washed with water and dried over anhydrous potassium carbonate. After filtration and removal of the solvent the product was distilled, giving 13.2 grams (91 percent) of 4-allyloxy-3,5-di-n-propylbenzyl-1-pyrrolidine as a nearly colorless liquid having a boiling point of 120 degrees centigrade at a pressure of 0.005 millimeter of mercury; $n_D^{25}$ 1.5122.

*Analysis.*—Calcd. for $C_{20}H_{31}NO$: C, 79.68; H, 10.37; N, 4.65. Found: C, 80.16; H, 10.68; N, 5.11.

(b) *Hydrochloride.*—A solution of 11.84 grams (0.039 mole) of the above free base in 300 milliliters of ether was acidified with ethanolic hydrogen chloride, and the solid which separated was isolated by filtration and washed with ether giving 13.22 grams (99.5 percent) of nearly white platelets having a melting point of 156 to 159 degrees centigrade. This was recrystallized from ethyl acetate, giving 10.81 grams (92.5 percent) of 4 - allyloxy - 3,5 - di - n - propylbenzyl - 1 - pyrrolidine hydrochloride as white platelets having a melting point of 160 to 161.5 degrees centigrade.

*Analysis.*—Calcd. for $C_{20}H_{32}ClNO$: C, 71.08; H, 9.55; Cl, 10.49. Found: C, 71.28; H, 9.15; Cl, 10.63.

EXAMPLE 8

(A) 4-ALLYLOXY-3,5-DIISOPROPYLBENZAMIDE

A solution of 96 grams (0.364 mole) of 4-allyloxy-3,5-diisopropylbenzoic acid, 75 milliliters of benzene and 54.4 milliliters (0.75 mole) of thionyl chloride was heated under reflux for two hours. The solvent and excess thionyl chloride were distilled under reduced pressure and the residue was diluted to 300 milliliters with absolute ether. Ammonia gas was passed into the solution with stirring until saturated and the mixture was shaken with water and with ether. The insoluble solid was collected by filtration and the ether layer was separated, washed with water, concentrated and cooled. The solid which separated from the cooled solution was isolated by filtration and combined with the solid previously isolated. The combined material was recrystallized from ethanol. There was thus obtained 4-allyloxy-3,5-diisopropylbenzamide in the form of a crystalline solid having a melting point of 169 to 171 degrees centigrade.

*Analysis.*—Calcd. for $C_{16}H_{23}NO_2$: C, 73.53; H, 8.87; N, 5.36. Found: C, 73.31; H, 8.79; N, 5.24.

(B) 4-ALLYLOXY-3,5-DIISOPROPYLBENZYLAMINE (a) *Free base*—To a suspension of 7.6 grams (0.2 mole) of lithium aluminum hydride in 100 milliliters of absolute ether was added a solution of 28.5 grams (0.109 mole) of 4-allyloxy-3,5-diisopropylbenzamide in 200 milliliters of tetrahydrofuran (previously distilled from lithium aluminum hydride). The ether refluxed slightly during the addition. An additional 100 milliliters of ether was added and the mixture was heated under reflux with stirring for six hours and was then allowed to stand at room temperature for three days. Then there were added slowly in succession 25 milliliters of ethyl acetate in 100 milliliters of ether, eight milliliters of water, six milliliters of twenty percent aqueous sodium hydroxide solution and 28 milliliters of water. After thorough mixing the solid which had separated was isolated by filtration and extracted with ether. The ether solution was extracted three times with dilute hydrochloric acid and then three times with water. The aqueous solutions were washed with ether and made basic by the addition of aqueous sodium hydroxide solution. The liberated oil crystallized after bubbling in nitrogen to remove the ether, and was collected (the aqueous filtrate (a) was retained), dried and recrystallized from Skellysolve B. There was thus obtained four grams of 4-allyloxy-3,5-diisopropylbenzylamine in the form of a crystalline solid which had a melting point of 46 to 48 degrees centigrade.

*Analysis.*—Calcd. for $C_{16}H_{25}NO$: N, 5.66. Found: N, 5.95.

(b) *Hydrochloride.*—The aqueous filtrate (a) obtained as described above was extracted with ether, washed with water and then with saturated sodium chloride solution and dried over anhydrous sodium sulfate. The Skellysolve B filtrate, remaining after recrystallization of the free amine as described above, was combined with this ether solution and made acidic by the addition of ethanolic hydrogen chloride. A gelatinous precipitate separated. The mixture was heated to the boiling point, treated with a small quantity of ethanol and scratched to induce crystallization. The crystalline solid was isolated by filtration, washed with absolute ether and dried. There was thus obtained 5.5 grams of the hydrochloride of 4-allyloxy-3,5-diisopropylbenzylamine in the form of a crystalline solid having a melting point of 210 to 213 degrees centigrade (with decomposition).

*Analysis.*—Calcd. for $C_{16}H_{26}ClNO$: C, 67.70; H, 9.23; N, 4.94; Cl, 12.49. Found: C, 67.60; H, 9.51; N, 5.23; Cl, 12.3.

EXAMPLE 9

4-Allyloxy-3,5-Dimethylbenzamide

A solution of 125 grams (0.607 mole) of 4-allyloxy-3,5-dimethylbenzoic acid, 75 milliliters of benzene and 90.8 milliliters (1.25 mole) of thionyl chloride was heated under reflux for two hours. The solvent and excess thionyl chloride were distilled under reduced pressure and the residue (4-allyloxy-3,5-dimethylbenzoyl chloride) was diluted to 335 milliliters with absolute ether. Ammonia gas was passed into the solution with rapid stirring until saturated. A white solid separated and the mixture was allowed to stand overnight at room temperature before being diluted with water and a small quantity of aqueous sodium hydroxide solution. The solid which had separated was collected, washed with water and with ether and dried (109 grams). The ether washings were separated and concentrated to yield a further 8.43 grams of the desired amide. The combined material was recrystallized from ethanol. There was thus obtained 4-allyloxy-3,5-dimethylbenzamide in the form of a crystalline solid having a melting point of 144 to 146 degrees centigrade.

*Analysis.*—Calcd. for $C_{12}H_{15}NO_2$: C, 70.22; H, 7.37; N, 6.82. Found: C, 70.29; H, 7.55; N, 7.09.

EXAMPLE 10

4-Allyloxy-3,5-Dimethyl-N,N-Diethylbenzamide 4-allyloxy-3,5-dimethylbenzoyl chloride was prepared, as described in Example 9, from 25 grams (0.12 mole) of 4-allyloxy-3,5-dimethylbenzoic acid. The crude acid chloride was diluted to 65 milliliters with absolute ether and a solution of 22 grams (0.3 mole) of diethylamine in fifty milliliters of absolute ether was added slowly with stirring at reflux temperature. The mixture was allowed to stand overnight at room temperature and was then extracted successively with dilute hydrochloric acid, water, dilute sodium hydroxide solution, water, and saturated sodium chloride solution, and dried over anhydrous sodium sulfate. The solvent was distilled and the residue was distilled under reduced pressure. There was thus obtained 4-allyloxy-3,5-dimethyl-N,N-diethylbenzamide in the form of an oil having a boiling point of 128 degrees centigrade at a pressure of 0.025 millimeter of mercury; $n_D^{25}$ 1.5230.

*Analysis.*—Calcd. for $C_{16}H_{23}NO_2$: C, 73.53; H, 8.87; N, 5.36. Found: C, 73.47; H, 8.90; N, 5.27.

EXAMPLE 11

3,5-Di-n-Propyl-4-β-Methallyloxybenzamide

A mixture of 12.5 grams of 3,5-di-n-propyl-4-β-methallyloxybenzoic acid, fifteen milliliters of thionyl chloride and fifteen milliliters of benzene was heated under reflux for two hours. The solvent was distilled under reduced pressure and 170 milliliters of 29 percent ammonium hydroxide was added cautiously with cooling. After shaking the mixture for two hours the solid which had separated was collected, washed with water, dried and recrystallized from methylcyclohexane. There was thus obtained 9.04 grams of 3,5-di-n-propyl-4-β-methallyloxy-benzamide in the form of a crystalline solid having a melting point of 134.5 to 136 degrees centigrade.

*Analysis.*—Calcd. for $C_{17}H_{25}NO_2$: C, 74.14; H, 9.15; N, 5.09. Found: C, 73.98; H, 8.93; N, 5.09.

EXAMPLE 12

*4-Allyloxy-3,5-Diethylbenzamide*

Ammonia gas was passed with stirring into 200 milliliters of a solution of 4-allyloxy-3,5-diethylbenzoyl chloride in benzene (prepared as described in Preparation 5(C)) until the solution was saturated. After stirring for a further one hour and standing overnight at room temperature, the mixture was diluted with ether, washed successively with dilute hydrochloric acid, water, dilute sodium hydroxide, twice again with water and with saturated sodium chloride solution. After drying over anhydrous sodium sulfate, the ether solution was distilled and the residue was recrystallized from ether. There was thus obtained 42.7 grams of 4-allyloxy-3,5-diethylbenzamide having a melting point of 166 to 167 degrees centigrade.

*Analysis.*—Calcd. for $C_{14}H_{19}NO_2$: C, 72.07; H, 8.21; N, 6.01. Found: C, 72.19; H, 8.40; N, 6.05.

EXAMPLE 13

(A) 4-ALLYLOXY-3,5-DIETHYL-N,N-DIETHYL-BENZAMIDE

To 36.5 grams (0.5 mole) of diethylamine was added slowly with stirring 200 milliliters of a solution of 4-allyloxy-3,5-diethylbenzoyl chloride in benzene (prepared as described in Preparation 5(C)). The mixture was heated under reflux for fifteen minutes, cooled, diluted with ether and washed successively with dilute hydrochloric acid, water, dilute sodium hydroxide solution, twice again with water and finally with saturated sodium chloride solution. After drying over anhydrous sodium sulfate, the ether solution was evaporated and the residue was distilled under reduced pressure. There was thus obtained 4-allyloxy-3,5-diethyl,N,N-diethylbenzamide in the form of a colorless liquid having a boiling point of 135 degrees centigrade at a pressure of 0.05 millimeter of mercury; $n_D^{25}$ 1.5183.

*Analysis.*—Calcd. for $C_{18}H_{27}NO_2$: C, 74.70; H, 9.41; N, 4.84. Found: C, 74.39; H, 9.44; N, 5.12.

(B) 4-ALLYLOXY-3,5-DIETHYL-N,N-DIETHYL-BENZYLAMINE (*a*) *Free Base.*—To 5.7 grams (0.15 mole) of lithium aluminum hydride in 100 milliliters of absolute ether was added slowly with stirring under reflux 28 grams (0.0965 mole) of 4-allyloxy-3,5-diethyl-N,N-diethylbenzamide in 100 milliliters of absolute ether. The mixture was heated under reflux for three hours and allowed to stand at room temperature overnight. To the mixture were added slowly in succession thirty milliliters of ethyl acetate in 100 milliliters of ether, six milliliters of water, five milliliters of twenty percent sodium hydroxide, and twenty milliliters of water. After thorough mixing the solution was filtered and the solid was well washed with ether. The ether solution was washed with water and extracted twice with dilute hydrochloric acid. The acid solution was washed with ether and made basic with dilute sodium hydroxide solution. The liberated oil was extracted three times with ether and the combined ether solutions were washed with water and saturated sodium chloride solution and dried over anhydrous sodium sulfate. The ether was evaporated and the residue was distilled under reduced pressure. There was thus obtained 4-allyloxy-3,5-diethyl-N,N-diethylbenzylamine in the form of a liquid having a boiling point of 105 degrees centigrade at a pressure of 0.025 millimeter of mercury; $n_D^{25}$ 1.5010.

*Analysis.*—Calcd. for $C_{18}H_{29}NO$: C, 78.49; H, 10.61. Found: C, 78.82; H, 10.84.

(*b*) *Hydrochloride.*—The above free base was dissolved in ether and acidified with alcoholic hydrogen chloride solution. The solid which separated was collected, washed with ether, dried and recrystallized from ethyl acetate. There was thus obtained 20.48 grams of the hydrochloride of 4-allyloxy-3,5-diethyl-N,N-diethylbenzylamine in the form of a crystalline solid having a melting point of 161 to 162 degrees centigrade.

*Analysis.*—Calcd. for $C_{18}H_{30}ClNO$: C, 69.31; H, 9.70; N, 4.49; Cl, 11.37. Found: C, 69.32; H, 9.41; N, 4.77; Cl, 11.43.

EXAMPLE 14

(A) 2-ALLYLOXY-3,5-DI-n-PROPYLBENZAMIDE

A solution of 87.5 grams 0.334 mole) of 2-allyloxy-3,5-di-n-propylbenzoic acid in fifty milliliters of benzene and 72.6 milliliters (1.0 mole) of thionyl chloride was heated under reflux for one and three-quarter hours. The excess thionyl chloride and benzene were distilled under reduced pressure. The residue was dissolved in absolute ether and ammonia gas was passed in with stirring and cooling in an ice-bath until saturated. After standing for one-half hour at room temperature, the mixture was washed twice with water, twice with dilute hydrochloric acid, twice with water and finally with saturated sodium chloride solution. The solution was dried over anhydrous sodium sulfate and the solvent distilled. The residue was recrystallized from Skellysolve B. There was thus obtained 65.4 grams of 2-allyloxy-3,5-di-n-propylbenzamide in the form of a crystalline solid having a melting point of 86 to 88 degrees centigrade.

*Analysis.*—Calcd. for $C_{16}H_{23}NO_2$: C, 73.53; H, 8.87; N, 5.36. Found: C, 73.63; H, 9.09; N, 5.14.

(B) 2-ALLYLOXY-3,5-DI-n-PROPYLBENZYLAMINE (*a*) *Free base.*—To a suspension of 7.6 grams (0.2 mole) of lithium aluminum hydride in 100 milliliters of absolute ether was added a solution of 26.1 grams (0.1 mole) of 2-allyloxy-3,5-di-n-propylbenzamide in 300 milliliters of absolute ether. After heating under reflux for three hours and standing overnight at room temperature there were added slowly in succession 25 milliliters of ethyl acetate, eight milliliters of water, six milliliters of twenty percent sodium hydroxide solution and 28 milliliters of water. The mixture was filtered and the solid was extracted with ether. The ether solution was shaken with dilute hydrochloric acid and then extracted with water. The aqueous solution and the aqueous acid solution were basified and the liberated amine was extracted with ether. The ether solution was washed with water and saturated sodium chloride solution and dried over anhydrous sodium sulfate. The solvent was removed and the residue was distilled under reduced pressure. There was thus obtained 13.14 grams of 2-allyloxy-3,5-di-n-propylbenzylamine in the form of a liquid having a boiling point of 103 degrees centigrade at a pressure of 0.05 millimeter of mercury; $n_D^{25}$ 1.5178.

*Analysis.*—Calcd. for $C_{16}H_{25}NO$: N, 5.62. Found: N, 5.58.

(*b*) *Hydrochloride.*—The above free base was dissolved in absolute ether and acidified with ethanolic hydrogen chloride solution. The mixture was allowed to stand at minus fifteen degrees centigrade and filtered. The filtrate was concentrated and treated with ethyl acetate. The solid which separated was collected and recrystallized from ethyl acetate. There was thus obtained 1.9 grams of the hydrochloride of 2-allyloxy-3,5-di-n-propylbenzylamine in the form of a crystalline solid having a melting point of 162 to 170.5 degrees centigrade.

*Analysis.*—Calcd. for $C_{16}H_{26}ClNO$: Cl, 12.49. Found: Cl, 12.40.

It is to be understood that the invention is not to be limited to the exact details of operation or exact com-

I claim:
1. A compound having the formula:

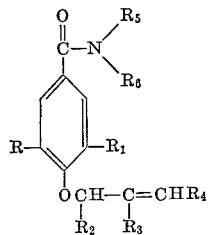

wherein R and $R_1$ represent lower-alkyl radicals, $R_2$, $R_3$, and $R_4$ are selected from the class consisting of hydrogen and lower-alkyl radicals, $R_5$ and $R_6$ taken individually are selected from the class consisting of hydrogen and lower-alkyl, and $R_5$ and $R_6$ taken together with —N< represent a saturated heterocyclic radical with from 5 to 7 atoms in the ring, one of which atoms, in addition to the nitrogen atom, is selected from the class consisting of carbon, nitrogen and oxygen, the other ring atoms being carbon.

2. 4-allyloxy-3,5-di-n-propylbenzamide.
3. 4-allyloxy-3,5-di-n-propyl-N-methylbenzamide.
4. 4-allyloxy-3,5-di-n-propyl-N,N-dimethylbenzamide.
5. 4-allyloxy-3,5-di-n-propyl-N,N-diethylbenzamide.
6. 1-(4-allyloxy-3,5-di-n-propylbenzoyl) - 4 - methylpiperazine.
7. 4-allyloxy-3,5-di-n-propylbenzoyl-1-pyrrolidine.
8. 4-allyloxy-3,5-dimethyl-N,N-diethylbenzamide.
9. 2-allyloxy-3,5-di-n-propylbenzamide.

References Cited in the file of this patent
UNITED STATES PATENTS

| | | |
|---|---|---|
| 2,608,584 | Sprules | Aug. 26, 1952 |
| 2,694,088 | Sayhun et al. | Nov. 9, 1954 |
| 2,754,327 | Sayhun et al. | July 10, 1956 |
| 2,895,992 | Ohnacker et al. | July 21, 1959 |

OTHER REFERENCES

Way et al.: Jour. Pharm. Experimental Therapeutics, vol. 108, pp. 450–458 (1953).